United States Patent [19]

Hara et al.

[11] Patent Number: 4,516,017

[45] Date of Patent: May 7, 1985

[54] HIGH-SENSITIVE OPTICAL READING APPARATUS AND METHOD OF READING OPTICAL INFORMATION

[75] Inventors: Masahiro Hara, Kariya; Atsutoshi Okamoto, Aichi; Toshiyasu Sakai, Kariya, all of Japan

[73] Assignee: Nippondenso Co., Ltd., Kariya, Japan

[21] Appl. No.: 458,022

[22] Filed: Jan. 14, 1983

[30] Foreign Application Priority Data

Jan. 20, 1982 [JP] Japan .................................. 57-8142
Sep. 28, 1982 [JP] Japan ................................ 57-169189

[51] Int. Cl.³ .............................................. G06K 7/10
[52] U.S. Cl. ................................... 235/472; 235/455
[58] Field of Search ................................ 235/472, 455

[56] References Cited

U.S. PATENT DOCUMENTS

| 3,914,748 | 10/1975 | Barton et al. | 235/455 X |
| 4,250,526 | 2/1981 | Fuwa et al. | 235/455 |
| 4,408,120 | 10/1983 | Brohka | 235/472 |

OTHER PUBLICATIONS

RCA Review, vol. 32, No. 2, Jun. 1971, pp. 251–262, P. K. Weimer, "Systems and Technologies for Solid-State Image Sensors".
IBM Technical Disclosure Bulletin, vol. 20, No. 6, Nov. 1977, pp. 2177–2178, G. N. Gaebelein et al: "Image Sensor with Integration Time Control".
IEEE Transactions on Electron Devices, vol. ED-18, No. 11, Nov. 1971, pp. 992–996, M. F. Tompsett: "Charge-Coupled Imaging Devices: Experimental Results".

Primary Examiner—Harold I. Pitts
Attorney, Agent, or Firm—Cushman, Darby & Cushman

[57] ABSTRACT

In an optical reading apparatus having an image sensor for converting optically readable information into an electrical signal, a sensor driving circuit is arranged to produce at least two clocks with which two or more groups of optical imaging elements of the image sensor are respectively driven. In one embodiment, the two clocks have a time or phase difference therebetween so that signal charges from one group of the imaging elements are derived at once after signal charges of another group are derived. The derived signal charges are read out in a sequence within a period equal to the time difference. This enables a charging time to be twice or more the time difference providing high sensitivity. Since at least two or more read data can be obtained within a single charging time, high-speed reading is also resulted. In another embodiment, the optical reader is switched so that one of high-speed mode and high-resolution mode is selected. In a further embodiment, the invention is adapted to a reader having an area image sensor.

13 Claims, 12 Drawing Figures

HIGH-SENSITIVE OPTICAL READING APPARATUS AND METHOD OF READING OPTICAL INFORMATION

BACKGROUND OF THE INVENTION

This invention relates generally to optical reading apparatus, such as a bar code reader, arranged to read coded information, characters or the like by an image sensor of electronic scanning type, and to a method of reading such optically readable information.

Among various types of optical reading apparatus a bar code reader using a charge transfer device imager or image sensor is known. When a charge transfer device image sensor is used as a transducer, a problem occurs that the output signal level from the image sensor would be low as the reading speed is increased. Namely, high-speed reading necessarily results in a short charge storage time which turns to insufficiently low output signal level, resulting in low sensitivity.

In order to increase the level of the output signal from such a charge transfer device image sensor, the intensity of incident light may be increased. However, this results in various problems, such as the increase in space occupied by the light source, power consumption and generated heat. Therefore, the intensity of incident light cannot be increased so much.

SUMMARY OF THE INVENTION

The present invention has been developed in order to remove the above-described drawbacks inherent to the conventional optical reading apparatus.

It is, therefore, an object of the present invention to provide an optical reading apparatus and a method of optically reading information, with which sufficient sensitivity is ensured even in high-speed reading.

According to a feature of the present invention a plurality of optical imaging elements arranged in an array, which are electrically divided in two or more groups, are respectively driven by different timing clocks so that signal charges from respective groups are derived at different timings. Although the frequency of each of the timing clocks is set to a value so that sufficient length of charging time is provided to increase the sensitivity, two or more reading data can be obtained within one cycle of charging period, resulting in increase in reading speed. In one embodiment, the operating mode of the reading apparatus may be switched to either high-speed mode or high-resolution mode.

In accordance with the present invention, there is provided an optical reading apparatus for converting optically readable information into an electrical signal, comprising: a charge transfer device image sensor for converting optical information into an electrical signal, the image sensor having a plurality of optical imaging elements arranged in an array, the optical imaging elements being electrically divided into two or more groups so that signal charges from one group can be derived simultaneously, the image sensor having an output circuit responsive to a plurality of electrical signals each produced by each of the two or more groups so that the plurality of electrical signals are combined as a single output signal; means for driving the image sensor so that the image sensor performs electronic scanning by deriving signal charges from the optical imaging elements; and means responsive to the output signal from the image sensor for processing the same to produce an electrical signal indicative of the read information, characterized in that the driving means produces at least two clocks which are shifted by an amount of time from each other, the at least two clocks being fed to the image sensor in such a manner that at least two groups of the optical imaging elements are driven alternately.

In accordance with the present invention, there is also provided an optical reading apparatus for converting optically readable information into an electrical signal, comprising: a charge transfer device image sensor for converting optical information into an electrical signal, the image sensor having a plurality of optical imaging elements arranged in an array, the optical imaging elements being electrically divided into two or more groups so that signal charges from one group can be derived simultaneously, the image sensor having an output circuit responsive to a plurality of electrical signals each produced by each of the two or more groups so that the plurality of electrical signals are combined as a single output signal; means for driving the image sensor so that the image sensor performs electronic scanning by deriving signal charges from the optical imaging elements, the means producing at least two clocks which are fed to the image sensor so that at least two groups of the optical imaging elements are driven; and means responsive to the output signal from the image sensor for processing the same to produce an electrical signal indicative of the read information, characterized by means for controlling the means for driving so that the at least two clocks have one of first and second time relationships therebetween, the at least two clocks being shifted by an amount of time from each other when in the first time relationship, and the at least two clocks being of the same timing when in the second time relationship, the two clocks having the first time relationship therebetween causing the image sensor to derive signal charges of one group after signal charges of another group have been derived, and the two clocks having the second relationship therebetween causing the image sensor to derive signal charges of all groups simultaneously.

In accordance with the present invention, there is further provided a method of optically reading optically readable information by means of a charge transfer device image sensor for converting optical information into an electrical signal, the image sensor having a plurality of optical imaging elements arranged in an array, the optical imaging elements being electrically divided into two or more groups so that signal charges from one group can be derived simultaneously, the image sensor having an output circuit responsive to a plurality of electrical signals each produced by each of the two or more groups so that the plurality of electrical signals are combined as a single output signal, characterized by the steps of: causing the optical imaging elements to deliver output signals therefrom so that one group of the optical imaging elements deliver signal charges after another group has delivered signal charges; deriving the signal charges of one group one after another so as to process corresponding electrical signals to detect optical information; and repeating the above steps with respect to each group of the optical imaging elements.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
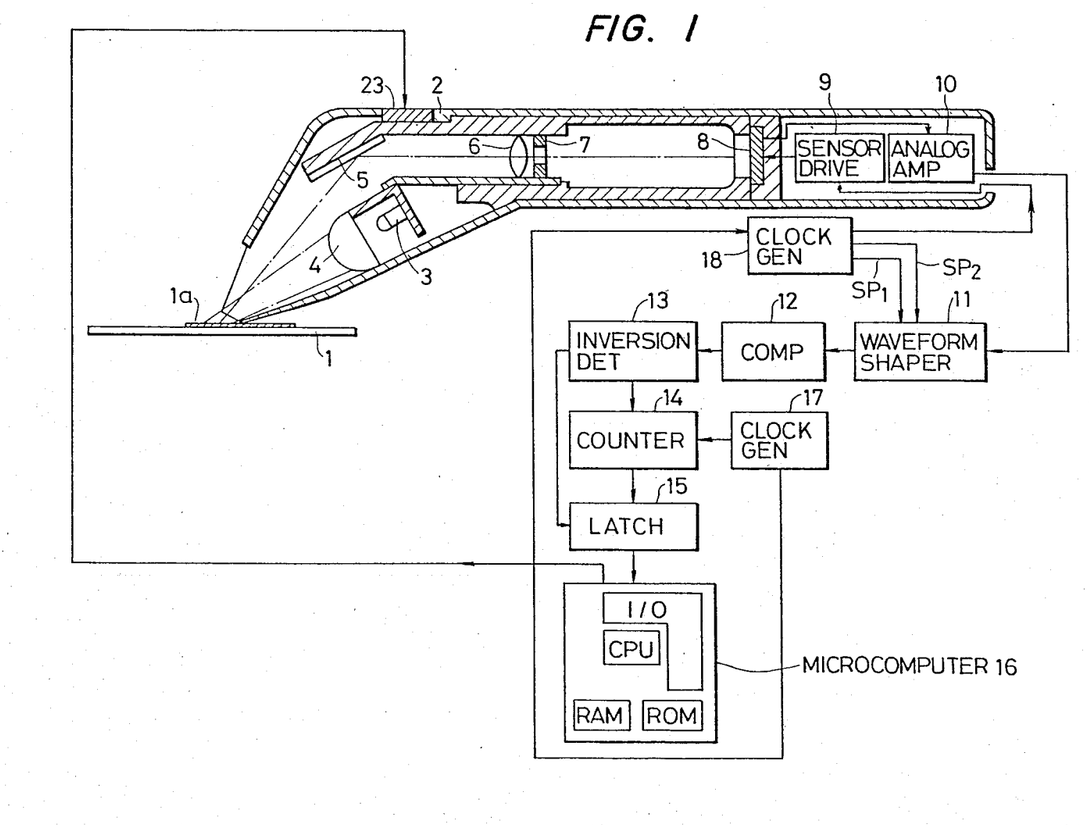
FIG. 1 is a schematic diagram of an embodiment of an optical reading apparatus according to the present invention.

Referring now to FIG. 1, a schematic diagram of a first embodiment of an optical reading apparatus according to the present invention is shown. The reading apparatus of the invention will be described in connection with a bar code reader which converts bar coded information into electrical signals indicative of figures, letters or the like. The reference 1 is a bar code label on which a bar code 1a having black bars and white bars (light spaces), which are all parallel to each other, are printed as a light and shade pattern.

Figure 2:
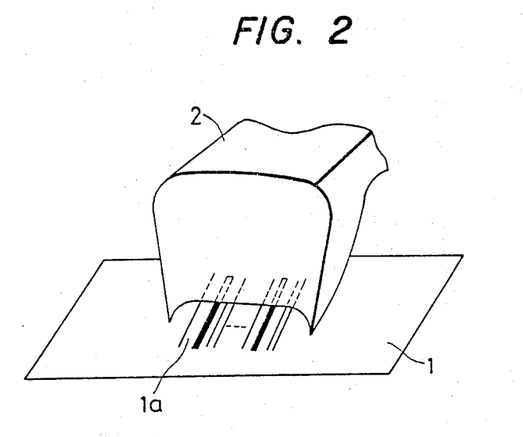
FIG. 2 is a schematic view showing the application of the reading apparatus of FIG. 1 as a bar code reader.

FIG. 2 illustrates the bar code label 1 and the head portion of the bar code reader of FIG. 1. Turning back to FIG. 1, the reference 2 indicates a casing of a hand-held bar code reader. The bar code reader comprises within the casing 2 a light source 3 having a plurality of lamps for illuminating the bar code label 1, and a semi-cylindrical lens 4 for condensing the light from the light source 3 so that the light is incident on the bar code label 1 after being condensed. The reference 5 is a reflecting mirror used for reflecting reflected light from the bar code label 1 in a predetermined direction, i.e. a direction toward an image sensor 8, and the reflected light from the reflecting mirror 5 is transmitted through a condenser lens 6 and a diaphragm member 7 having an elongate slit arranged so that its longitudinal direction is perpendicular to the reading direction which is normal to the parallel bars, to the image sensor 8 where an image of the bar code 1a to be scanned is imaged thereon. The image sensor 8 uses a one-dimentional or linear image sensor which converts the image on the scanning line into an electrical signal by electronic scanning operation. A dot-dash line in FIG. 1 indicates the locus of light in the optical system. The reference 9 is a driving circuit for the image sensor 8. Necessary clock pulses for driving the image sensor 8 are produced by the driving circuit 9 by changing clock pulses from a clock generator 18, and are applied to the image sensor 8.

The reference 10 is an analog amplifier which amplifies an output electrical signal from the image sensor 8, obtained by scanning. The reference 11 is a waveform shaping circuit for shaping the waveform of the output signal from the analog amplifier 10, and this waveform shaping circuit 11 comprises a sample-and-hold circuit for converting the output signal into a continuous signal and a low pass filter for smoothing the output signal waveform. The reference 12 is a comparator for converting the waveform shaped signal from the waveform shaping circuit 11 into a binary signal having high and low levels respectively corresponding to the black and white bars. The reference 13 is an inversion detecting circuit, which sends a latch pulse and clear pulse retarded slightly from the latch pulse to a latch 15 and a counter 14 each time of inversion, i.e. the instants of rising and falling of the binary signal are detected. The reference 17 is a first clock generator for generating two basic clock pulse trains each having a predetermined frequency. The counter 14 repeats counting the number of pulses of one of the basic clocks each time it is cleared in response to the clear pulse from the inversion detecting circuit 13, and its count indicates a value corresponding to the width of each bar of the bar code 1a. The latch 15 stores therein the counts of the counter 14, i.e. the width of each bar, which is obtained just before the counter 14 is cleared. The clock generator 18, which will be referred to as a second clock generator, is responsive to the first clock generator 17 so that the former produces clock pulse trains necessary for driving the image sensor 8, and two timing clock pulse trains which are respectively necessary for the sample-and-hold circuit in the waveform shaping circuit 11.

A microcomputer 16 having a central processing unit (CPU), a random access memory (RAM), a read-only memory (ROM), and an input-output device (I/O) is provided to decode the output information from the latch 15 so as to detect the width of each bar. A piezoelectric buzzer 19 is provided to the casing 1 of the hand-held bar code reader to inform the operator of the completion of reading. Namely, the piezo-electric buzzer 19 is responsive to an output signal from the microcomputer 16, which is emitted when the width of all the bars is detected.

Figure 3:
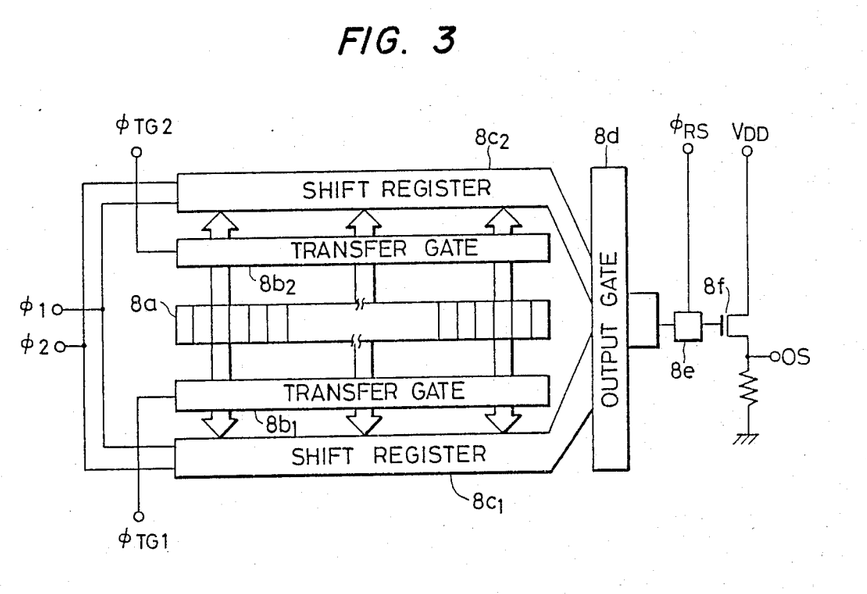
FIG. 3 is a schematic circuit diagram showing the image sensor used in the apparatus of FIG. 1.
Figure 4:
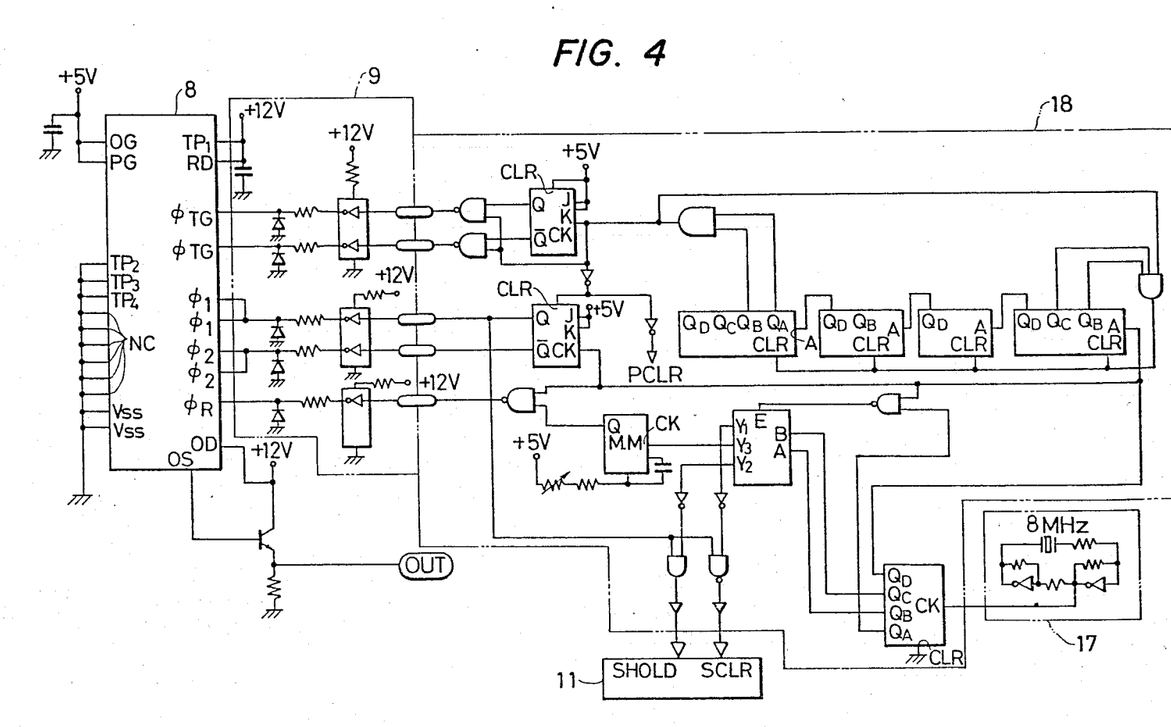
FIG. 4 is a circuit diagram showing circuitry for driving the image sensor of FIG. 1.

FIG. 3 is a circuit diagram of the image sensor 8 shown in FIG. 1. The image sensor 8 functioning as a transducer is of a charge-coupled device (CCD) type which formed in an LSI chip as shown in FIG. 4. The image sensor 8, comprises an array of optical imaging elements or photodiodes 8a, a pair of transfer gates 8b1 and 8b2, a pair of shift registers 8c1 and 8c2, an output gate 8d, a reset gate 8e, and an FET 8f. The photodiode array 8a receives the light from the lens 6 so that an image of a received bar code is converted into an electrical signal by producing a plurality of signal charges in each capacitor of each photodiode. The plurality of photodiodes in the array 8a are electrically divided into two groups. The first group includes photodiodes of odd number, and the second group includes photodiodes of even number. The words, odd and even numbers respectively mean the order of the photodiodes numbered from one end of the array. The first transfer gate 8*b*1 is responsive to the first group photodiodes, while the second transfer gate 8*b*2 is responsive to the second group photodiodes. In other words, the first and second transfer gate 8*b*1 and 8*b*2 are respectively responsive to the output signals or signal charges from photodiodes which are alternately arranged.

The first and second transfer gates 8*b*1 and 8*b*2 are respectively driven by first and second transfer gate clocks $\phi_{TG1}$ and $\phi_{TG2}$. The first and second shift registers 8*c*1 and 8*c*2 are respectively responsive to the output signals from the first and second transfer gates 8*b*1 and 8*b*2. Namely, signal charges from the odd photodiodes are fed via the first transfer gate 8*b*1 to the first shift register 8*c*1, while signal charges from the even photodiodes are fed via the second transfer gate 8*b*2 to the second shift register 8*c*2. The first and second shift registers 8*c*1 and 8*c*2 are respectively driven by first and second shift register clocks $\phi_1$ and $\phi_2$ so that signals temporarily stored in each shift register are derived out one after another in response to pulses of corresponding clocks. The output signals from the first and second shift registers 8*c*1 and 8*c*2 are both fed to the output gate 8*d* in which these two output signals are combined to produce a single output. The reset gate 8*e* is driven by a clock pulse train $\phi_{RS}$ so that the amplitude of the output signal from the output gate 8*d* is periodically fixed to a voltage at the drain of the FET 8*f*. The drain-source path of the FET 8*e* is interposed between a power supply $V_{DD}$ and ground. The output terminal of the image sensor 8 is designated at the reference OS..

FIG. 4 is a circuit diagram showing a detailed structure of the driving circuit 9, and the first and second clock generators 17 and 18. The second clock generator 18 is responsive to clock pulses from the first clock generator 17 so that various clock pulses are produced by counting and processing the basic clock, and these various clock signals produced by the second clock generator 18 are applied via the driving circuit 9 to the image sensor 8 as scanning signals. Furthermore, the second clock generator 18 produces another clock or control signal which is applied to the sample-and-hold circuit of the waveform shaping circuit 11. This control signal is synchronized with the scanning signal, and is used to convert discrete signals into a continuous signal.

Figure 5:
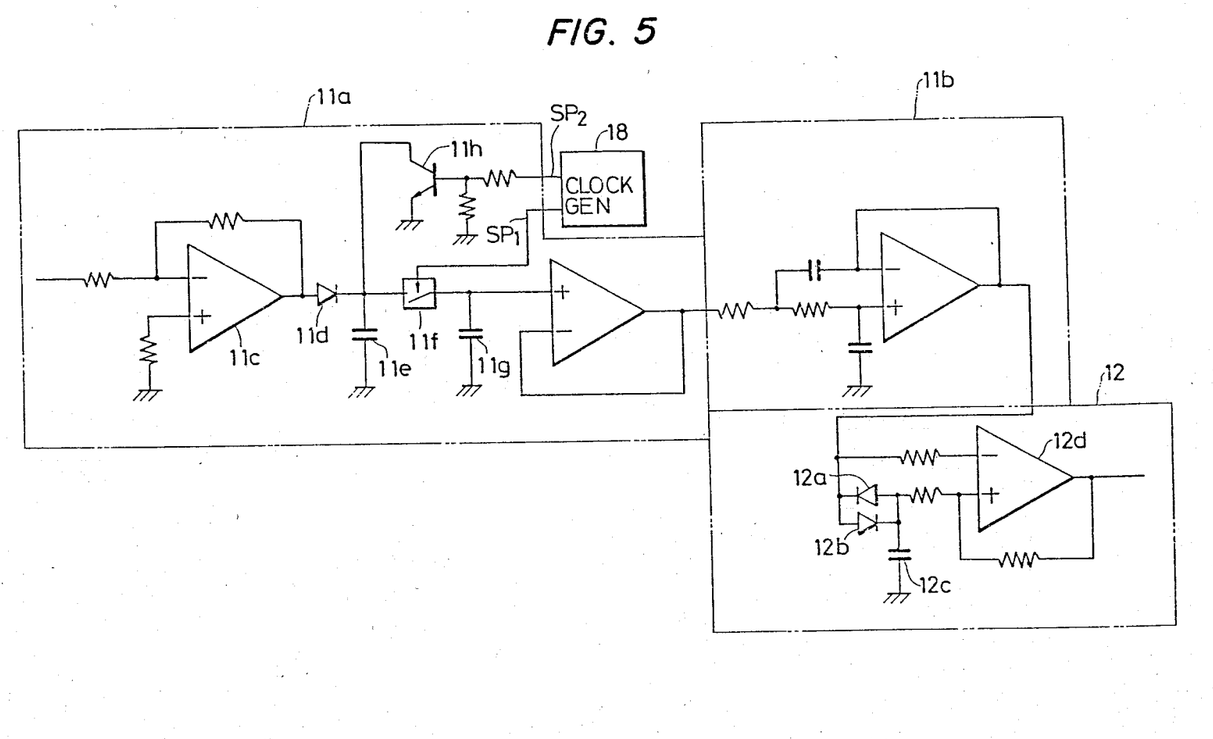
FIG. 5 is a circuit diagram showing circuitry which processes an electrical output signal from the image sensor of FIG. 1.

FIG. 5 is a detailed circuit diagram of the waveform shaping circuit 11, and the comparator 12. The waveform shaping circuit 11 comprises the sample-and-hold circuit 11*a* and the low pass filter 11*b* as described in the above so that discrete signals are converted into a continuous signal, while harmonic noises are removed when shaping the waveform. The comparator 12 produces pulse signals indicative of black and white bars.

The bar code reader having the structure described in the above operates as follows. In order to read a bar code 1*a* printed on the bar code label 1, the head portion of the hand-held bar code reader is directed at the bar code label 1 as shown in FIG. 2 with the light source 3 being energized. The light rays from the light source 3 is condensed by the lens 4 to illuminate the bar code label 1 so that the intensity of light reflected at black bars is lower than that of reflected light from white bars. The reflected light is transmitted through the reflecting mirror 5, the lens 6 and the diaphragm member 7 so that the pattern of the bar code 1*a* is imaged on a scanning line on the image sensor 8. Since the elongate slit made in the diaphragm member 7 is perpendicular to the reading line, the focal depth is made sufficiently deep to avoide unfocussing, and a sufficient amount of light can pass therethrough to ensure accurate reading by the image sensor 8.

The image sensor 8 performs electronic scanning in receipt of clock pulse signals from the driving circuit 9 so that the black and white bars imaged on the scanning line thereof are converted into corresponding electrical signals. The clock pulses from the driving circuit 9 are repeatedly fed to the image sensor 8 so that electronic scanning is repeatedly effected until reading is completed. The output electrical signal from the image sensor 8 is amplified by the analog amplifier 10, and then fed to the waveform shapig circuit 11.

Now the operation of the image sensor 8 will be described with reference to timing chart of FIG. 6. The aforementioned first and second transfer gate clocks $\phi_{TG1}$ and $\phi_{TG2}$ are shown to appear alternately at a period of $T_2$ or $T_3$. This means that odd signal charges and even signal charges are respectively derived from the photodiode array 8*a* at different timings. Below the waveforms of the first and second transfer gate clocks $\phi_{TG1}$ and $\phi_{TG2}$ are shown waveforms of the first and second shift register clocks $\phi_1$ and $\phi_2$ by which the signal charges are respectively fed from the first and second shift registers 8*c*1 and 8*c*2 to the output gate 8*d*. Below $\phi_1$ and $\phi_2$ is shown a waveform of the reset pulse $\phi_{RS}$ by which the reset gate 8*e* is turned on and off to derive the output signal from the output gate 8*d*.

Figure 6:
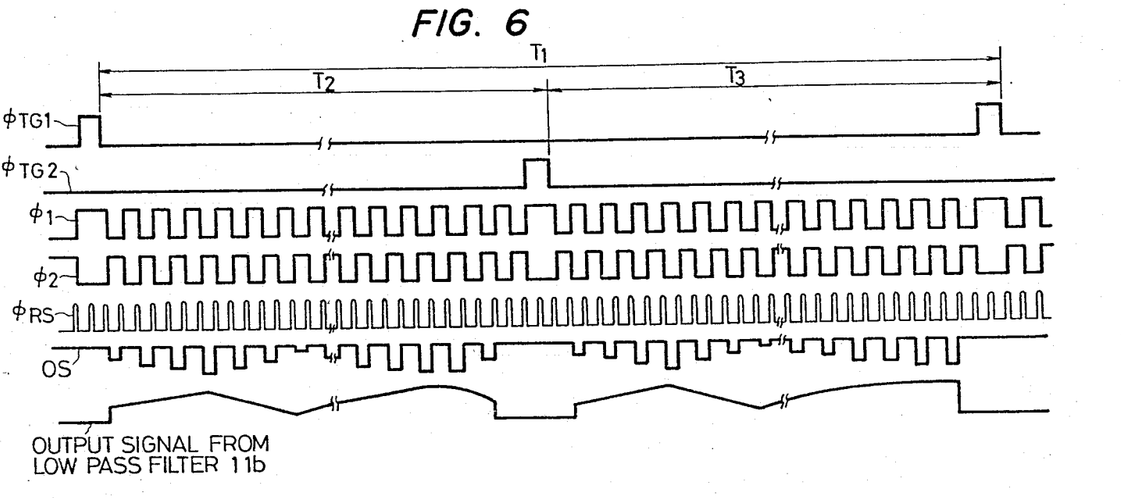
FIG. 6 is a timing chart useful for understanding the operation of the embodiment of FIGS. 1 through 5.

Describing the operation of the image sensor 8 in further detail, when the above-mentioned clocks of FIG. 6 are applied to the image sensor 8, the first transfer gate 8*b*1 is made open in response to the first transfer gate pulse $\phi_{TG1}$ so that odd signal charges stored in capacitances of odd photodiodes are all transferred to the first shift register at once. Then the odd signal charges are transferred one after another to the output gate 8*d* in response to the first shift register clock $\phi_1$ and the reset pulse $\phi_{RS}$. At this time the second transfer gate 8*b*2 is closed, and therefore, even signal charges are still stored in the capacitors of the even photodiodes. As a result, only the odd signal charges are derived one after another during a period of time $T_2$. At the end of the period $T_2$, the second transfer gate clock $\phi_{TG2}$ is applied to the second transfer gate 8*b*2 to open the same. Thus, even signal charges are transferred to the second shift register 8*c*2 at once. Then the siganl charges in the second shift register 8*c*2 are fed to the output gate 8*d* one after another within a period of time $T_3$ whose length is equal to that of $T_2$ in this embodiment. The above operations are repeated so that continuous scanning is performed.

From the above, it will be understood that the storing time of the odd signal charges is equal to the interval between two consecutive pulses of the first transfer gate clock $\phi_{TG1}$, and the storing time of the even signal charges equals the interval between two consecutive pulses of the second transfer gate clock $\phi_{TG2}$. This interval is twice $T_2$ or $T_2+T_3$, and is expressed in terms of $T_1$. Namely, the storing time can be made twice the reading cycle in which the signal charges indicative of black and white bars are decoded. This means that if the reading cycle is set constant, the charging or storing time can be doubled when compared with a case in which the stored signal charges of all photodiodes are derived at once. This doubled storing time results in increase in sensitivity in double.

The output signal obtained at the output terminal OS of the image sensor 8 is shown below the waveform of the reset pulse $\phi_{RS}$, and is applied to the analog amplifier 10 to be amplified therein, and then the amplified output signal is fed to the waveform shaping circuit 11.

The operation of the waveform shaping circuit 11 will be described with reference to FIG. 5. The sample-and-hold circuit 11a of the waveform shaping circuit 11 is responsive to the output signal from the reading sensor 8 so that discrete signals, which are synchronized with the shift clock $\phi_1$ or $\phi_2$, are converted into a continuous signal by sampling and holding the output signal from the image sensor 8 at the timing of the sampling clocks SP$_1$ and SP$_2$ fed from the second clock generator 18. The sample-and-hold circuit 11a comprises an inverting amplifier 11c which inverts the discrete output signals from the image sensor 8, a diode 11d and a capacitor 11e which hold a peak value of the output signal from the inverting amlplifier 11c. An analog switch 11f performs on-off operation in response to pulses of the first sampling clock SP$_1$ from the second clock generator 18 so that the peak value stored in the capacitor 11e is intermittently transmitted to another capacitor 11g. Thus, the peak voltage is transmitted to the capacitor 11g in which it is stored until an instant of subsequent sampling. The reference 11h is a transistor adapted to discharge the capacitor 11e after the analog switch 11f opens with the peak voltage across the capacitor 11e being transmitted to the capacitor 11g, in synchronizm with pulses of the second sampling clock SP$_2$ so that the capacitor 11e is prepared to holding operation on next sampling.

Figure 7:
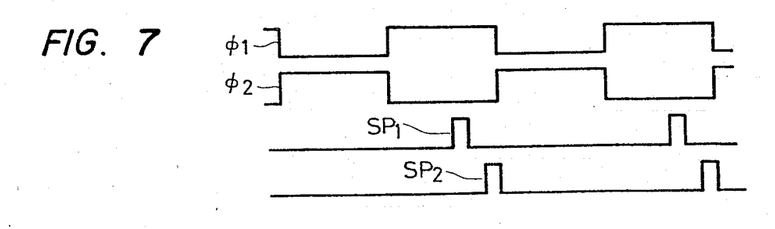
FIG. 7 is another timing chart also useful for understanding the operation of the embodiment of FIGS. 1 through 5.

FIG. 7 illustrates the timing of the sampling clock pulses SP$_1$ and SP$_2$ with respect to the shift register clocks $\phi_1$ and $\phi_2$. A first sampling pulse SP$_1$ is fed to the analog switch 11f to close the same so that the peak value of the video signal is transmitted therethrough to the capacitor 11g. Then a second sampling pulse SP$_2$ is fed to the transistor 11h so that peak voltage stored in the capacitor 11e is discharged. It will be understood that these first and second sampling clocks SP$_1$ and SP$_2$ are synchronized with the shift register clocks $\phi_1$ and $\phi_2$.

The reference 11b is a low pass filter which extracts low frequency components from the output signal of the sample-and-hold circuit 11a. The cutoff frequency of the low pass filter 11b is set to a value which is lower than the frequency of the continuous signal corresponding to a wide bar of the bar code 1a, from the sample-and-hold circuit 11a. With the provision of the low pass filter 11b, noise componets etc are removed from the continuous signal. The downmost waveform in FIG. 6 shows the continuous signal passed through the low pass filter 11b. The waveform shaping circuit 11 comprises the above-mentioned sample-and-hold circuit 11a and the low pass filter 11b so that the output video signal in the form of discrete signals, is shaped to be a continuous analog signal.

The output signal from the low pass filter 11b of the waveform shaping circuit 11 is applied to the comparator 12 which converts the analog signal into a binary signal of high and low levels corresponding to the black bars and white bars. In the comparator 12, the references 12a and 12b are inverse-parallel connected diodes, 12c a capacitor both connected to a noninverting input terminal of an operational amplifier 12d. Namely, the amplitude of the input signal is reduced by the forward voltage drop of the diodes 12a and 12b, while the phase of the input signal is shifted by the capacitor 12c to provide a reference signal for the comparison with the input signal. The operational amplifier 12d compares the output signal from the low pass filter 11b with the reference signal to obtain a bianary signal at its output. The binary signal corresponding to the black and white bars is used to derive data indicative of the width of each bar in the following circuits shown in FIG. 1. Namely, the width of each pulse in the binary signal is measured by counting the number of clock pulses by the counter 14 so as to produce data indicative of the width of each bar. This data is read by the microcomputer 16 so that predetermined operation is executed to complete reading of the bar code 1a.

In the above-described embodiment, although the time interval T$_2$ equals T$_3$ as shown in FIG. 6, T$_2$ is not required to be equal to T$_3$. Namely, T$_2$ and T$_3$ may be selected so that each of the odd and even signal charges can be read out from the corresponding shift registers 8c1 and 8c2 within these periods of time T$_2$ and T$_3$ respectively. Thus, odd and even signal charges can be stored in the photodiode array for T$_1$ which equals the sum of T$_2$ and T$_3$.

From the above it will be understood that in the above-described embodiment, odd and even signal charges in the optical imaging elements, i.e. the photodiodes 8a, are separately and alternately derived at different timings so that it is possible to provide a charge storing time which is twice the reading time. This results in increase in sensitivity as described in the above. Moreover, this improves S/N of the output signal from the image sensor 8. In other words, the amplitude of the electrical signals corresponding to each bar can vary throughout a larger range. Thus, it is possible to accurately detect white and black bars with these bars being accurately converted into corresponding binary signals. Such accurate conversion provides stable reading operation. Generally speaking, a plurality of read data are usually necessary to determin the read information with high accuracy. Therefore, in the above-described emobodiment, since two pieces of read data can be obtained within one cycle of charging period T1, a high-speed reading may be achieved.

Moreover, since the charging time is made longer than the reading time for each group of the optical imaging elements 8a, high sensitivity is obtained which contributes to stable converting operation for producing binary signals indicative of light and shade bars. Furthermore, optical imaging elements of the two groups are respectively and alternately driven or scanned, undesirable influence due to variations in characteristics of each imaging element can be reduced. Namely, signal variations due to such characteristic variation does not affect the reading operation.

Figure 8:
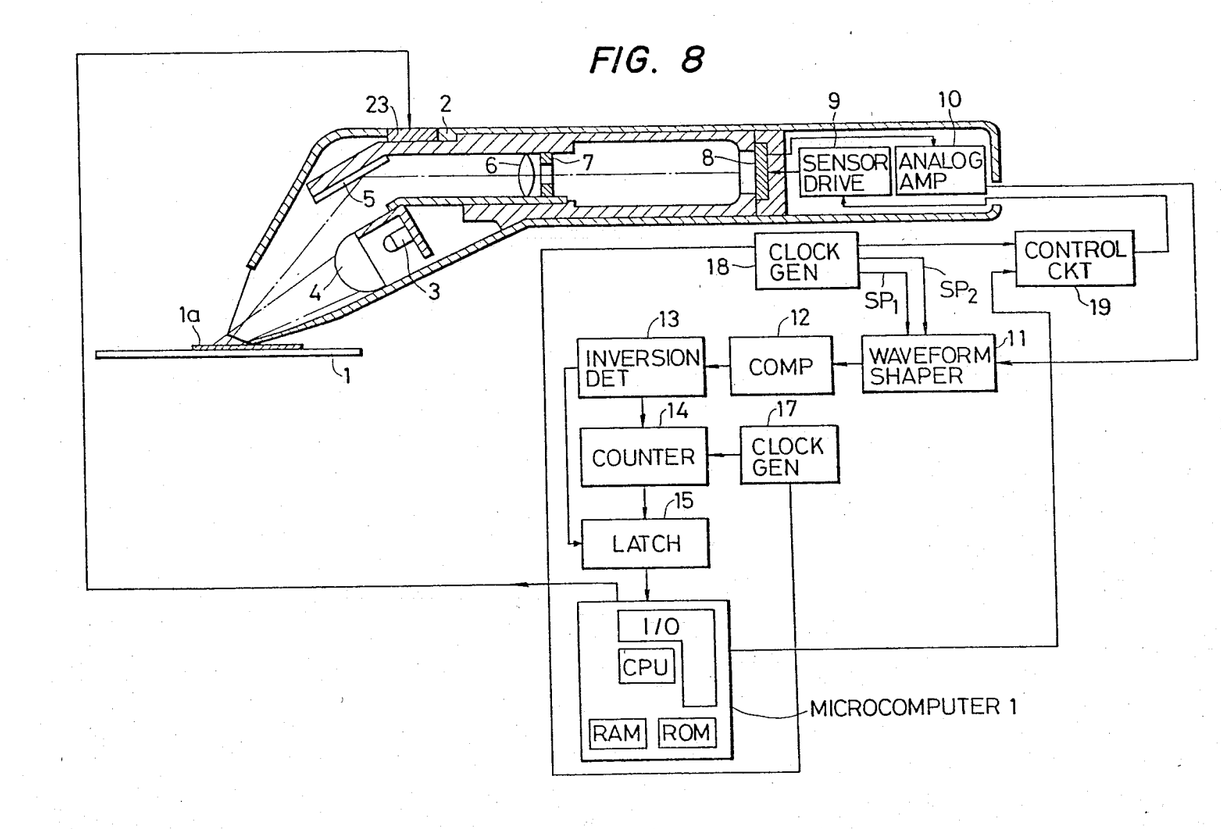
FIG. 8 is a schematic diagram of a second embodiment of an optical reading apparatus according to the present invention.

Now a modification of the above-embodiment or second embodiment of the present invention will be described with reference to FIGS. 8 through 11. This embodiment differs from the above-described first embodiment in that a transfer gate clock control circuit 19 is added as shown in FIG. 8. Namely, the transfer gate clock control circuit 19 is responsive to a clock from the second clock generator 18 and to a command signal from the microcomputer 16 so that the image sensor 8 is driven in two different ways as will be described hereinbelow.

Figure 9:
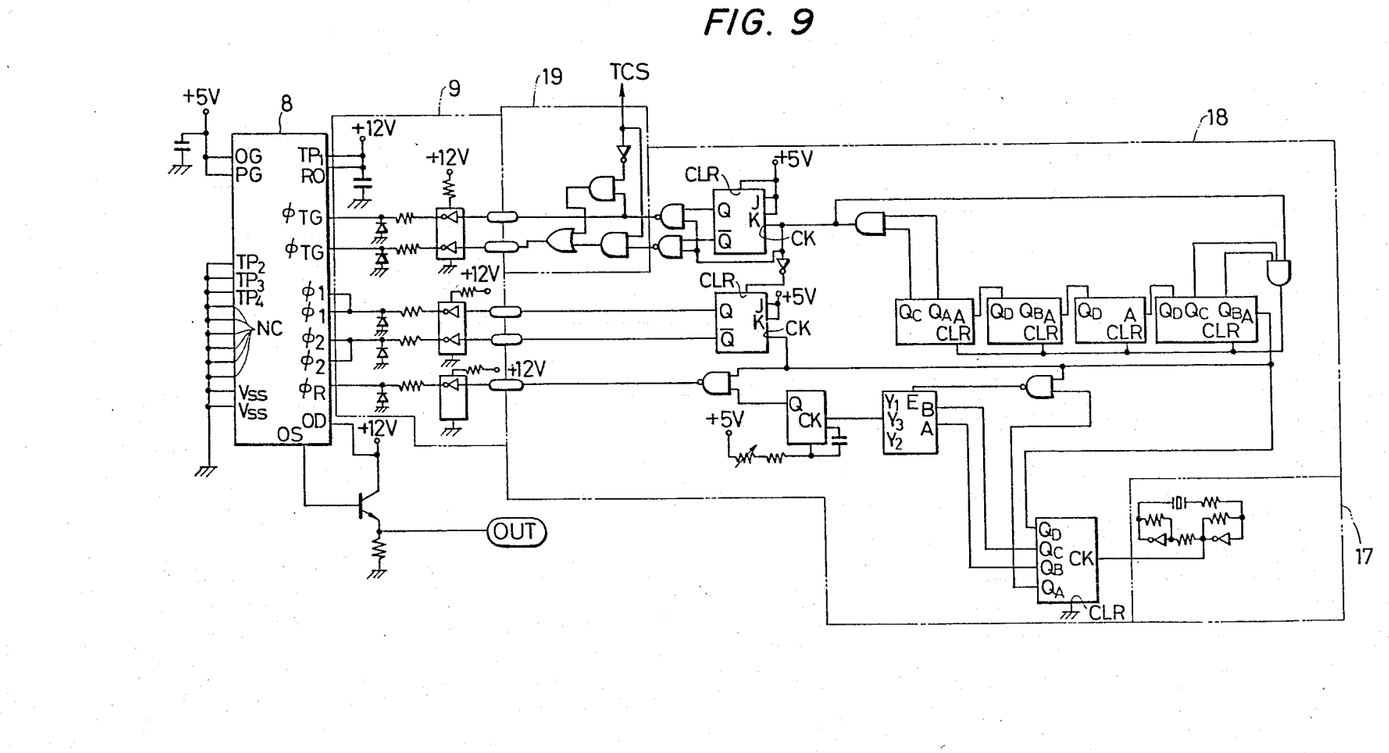
FIG. 9 is a circuit diagram showing circuitry for driving the image sensor of FIG. 8.

FIG. 9 shows a detailed circuit diagram of the transfer gate clock control circuit 19 of FIG. 8. The structure of the image sensor 8 as well as other circuits used in the second embodiment is substantially the same as that of the first embodiment, and therefore description thereof is omitted. The reference TCS in FIG. 9 indicates a transfer gate clock control signal fed from the microcomputer 16 to the transfer gate clock control circuit 19. The control signal TCS is arranged to assume one of high and low levels to control the transfer gate clock control circuit 19 so as to produce two kinds of output clock signals which are fed to the sensor driving circuit 9.

What is intended by the second embodiment is to switch the image sensor 8 so that one of high-speed and low-speed operations is selected. As described in connection with the first embodiment, if the reading time T2 equals T3, the reading time T2, T3 is one half the charge storing time T1, providing two read data within the charging time T1. Therefore, high-speed signal processing can be attained. However, such increase in reading speed necessarily results in deterioration in resolving power. When high resolving power is not needed, the first embodiment reading apparatus satisfactorily operates at a high speed. However, when high resolving power is required, it is desirable that the resolving power can be increased with the reading speed reduced. The second embodiment has been provided so that it is possible to select one of high-speed, low-resolving power mode and low-speed, high-resolving power mode is selected. In the illustrated second embodiment, the control signal TCS is produced by the microcomputer 16. Namely, above selection is automatically effected by detecting the result of signal processing as will be described later. However, if desired, this selection between the two modes may be manually controlled.

Figure 10:
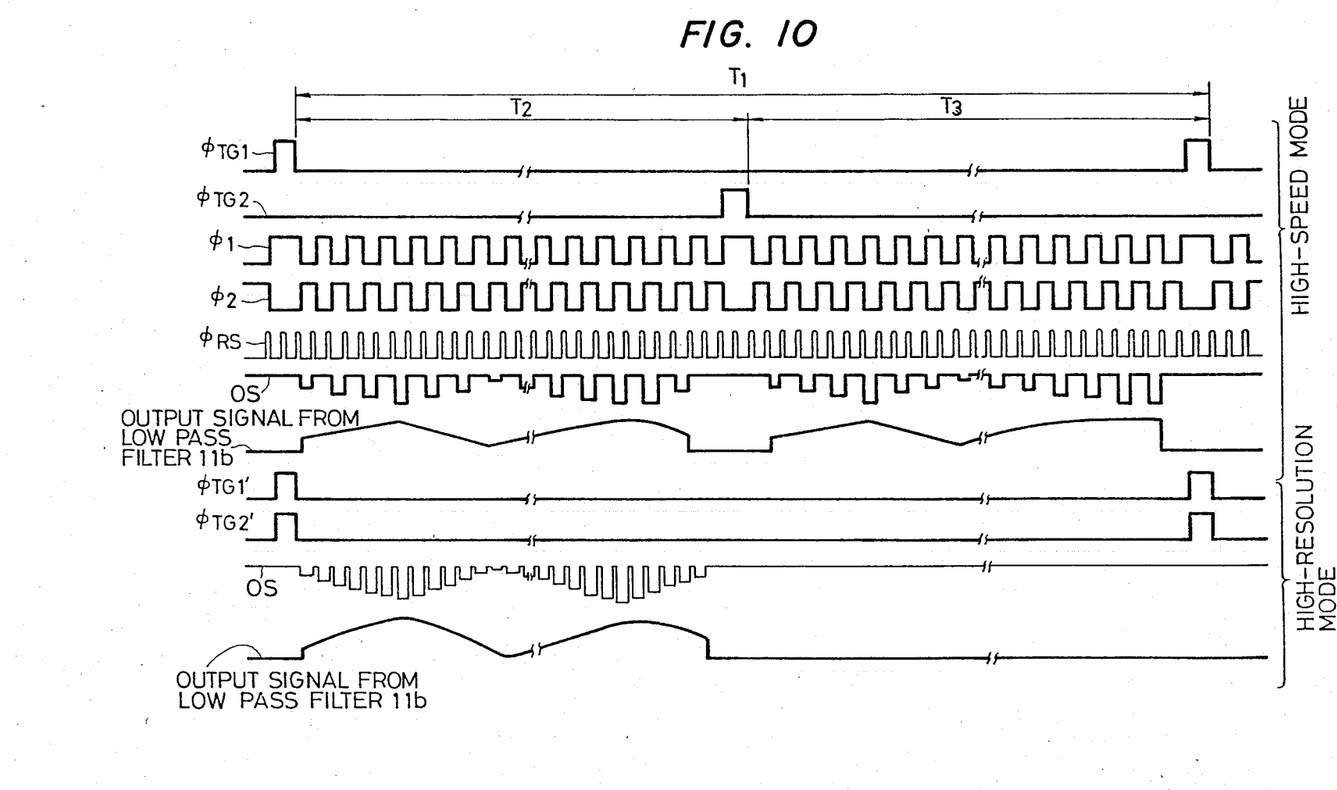
FIG. 10 is a timing chart useful for understanding the operation of the second embodiment of FIGS. 8 and 9.

The operation of the second embodiment of FIGS. 8 and 9 will be described in detail with reference to FIGS. 10 and 11. When the control signal TCS applied from the microcomputer 16 assumes a low level, the first and second transfer gate clocks $\phi_{TG1}$ and $\phi_{TG2}$ are produced in the same manner as in the first embodiment. Under this condition, the reading apparatus operates as described in connection with the first embodiment. On the other hand, when the control signal TCS is switchd to high level, the timing or phase of the second transfer gate clock $\phi_{TG2}$ is changed so that its timing equals that of $\phi_{TG1}$ as shown in waveforsm $\phi_{TG1}'$, and $\phi_{TG2}'$, in FIG. 10. Therefore, the odd and even signal charges in the optical imaging elements or photodiodes 8a are simultaneously derived to be transferred to the first and second transfer gates 8b1 and 8b2 of FIG. 3, and the signal charges in the first and second transfer gates 8b1 and 8b2 are simultaneously transferred to the first and second shift registers 8c1 and 8c2 respectively. The first and second shift registers 8c1 and 8c2 are driven by the shift register clocks $\phi_1$ and $\phi_2$, and therefore, odd and even signal charges are respectively fed to the output gate 8e one after another. Therefore, the output signal at the output terminal OS shows a frequency which is twice the frequency of the output signal obtained with $\phi_{TG1}$ and $\phi_{TG2}$. Accordingly, the resolving power is increased as much as the increase in frequency. The charge storing time T1 is the same as that of high-speed reading, and therefore, an adequate sensitively is also ensured. However, when the high-resolving power mode is selected, the number of output data obtained during the period T1 is only one whereas the number of data obtained in high-speed mode is two. In order to increase the liability of output data, several data are usually necessary as described in the above. Suppose four data are necessary to find coincidence therebetween, the high-resolving power mode requires a duration expressed by 4T1. On the other hand, the high-speed mode requires a duration of 2T1 to the same end. Namely, the high-resolving power mode needs twice the reading time of the high-speed mode.

Figure 11:
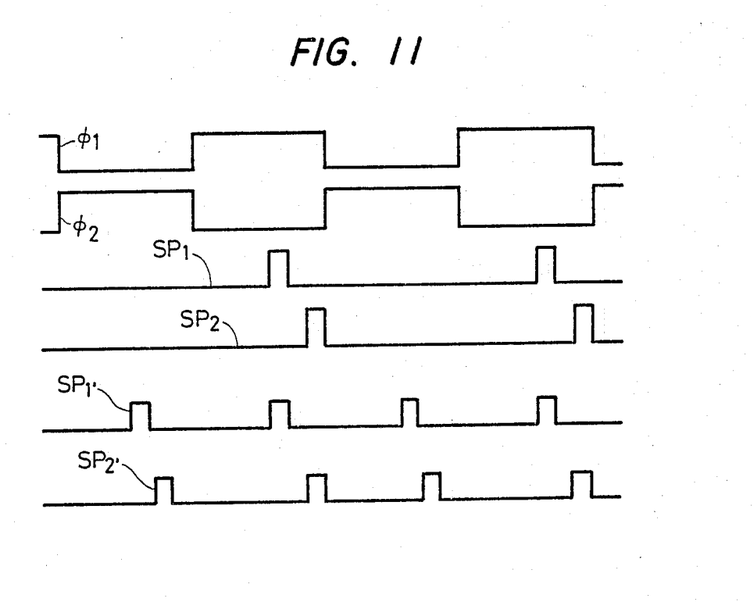
FIG. 11 is another timing chart also useful for understanding the operation of the second embodiment.

FIG. 11 is a timing chart showing the relationship between the first and second shift register clocks $\phi_1$ and $\phi_2$ and the above-mentioned first and second sampling clocks SP$_1$ and SP$_2$. Wavefors denoted by $\phi_1$, $\phi_2$, SP$_1$ and SP$_2$ are substantially the same as those of FIG. 7 illustrating the operation of the first embodiment. Namely, when high-speed mode is selected when using the second embodiment reader, sampling and holding operations are performed in the same way as in the first embodiment. However, when the high-resolving power mode is selected, the waveforms of the first and second sampling clocks SP$_1$ and SP$_2$ are changed as indicated by the references SP$_1'$ and SP$_2'$. Namely, the frequency of these sampling clocks is doubled. Although FIG. 9 does not show circuitry for producing the first and second sampling clocks SP$_1$, SP$_2$, SP$_1'$ and SP$_2'$, circuitry of the second clock generator of FIG. 4 may be modified so that the frequency of the first and second sampling clocks is changed to high in response to the high level transfer gate clock control signal TSC applied to the transfer gate clock control circuit 19.

The above-mentioned high-speed mode and high-resolving power mode are automatically selected as described in the above. Namely, the microcomputer 16 usually produces a low level TCS signal. As a result, the image sensor 8 is put in high-speed mode. The microcomputer 16 detects the width of each bar from the information from the latch 15 as described in connection with FIG. 1, and further detects if the width measured is equal to or greater than a predetermined value. If the width of a detected bar is narrower than the predetermined width, it is regarded that the resolving power of the image sensor 8 is insufficient. Then the microcomputer 16 turns the control signal TCS to high level. As a result, the transfer gate clock control circuit 19 receives the high level control signal TCS so that the image sensor 8 is put in high-resolving power mode. Namely, the transfer gate clocks $\phi_{TG1'}$ and $\phi_{TG2'}$ are respectively applied to the transfer gates 8b1 and 8bc. If desired, however, the selection between high-speed mode and high-resolving power mode may be manually effected with a suitable manual switch provided to produce the control signal of high or low level.

Although the above-described embodiments are both directed to a bar code reader, and therefore, the reading sensor 8 of one-dimentional or linear type is employed, the present invention is not limited to such a linear image sensor. Namely, the present invention may be adapted to a two-dimentional or area image sensor.

Figure 12:
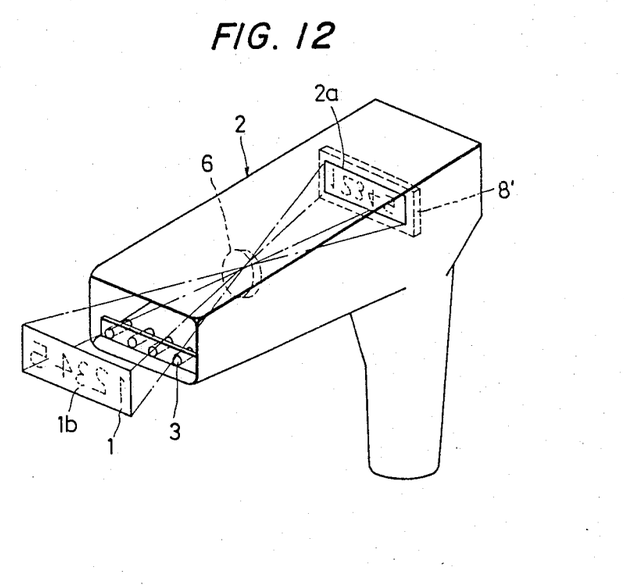
FIG. 12 is a schematic perspective view of a third embodiment optical reading apparatus according to the present invention.

Hence, reference is now made to FIG. 12 showing a schematic perspective view of a third embodiment of the present invention. FIG. 12 shows an optical reader adapted to read or recognize figures or characters 1b printed on a label 1. The optical reader of FIG. 12 comprises, therefore, a two-dimentional image sensor 8' which converts a two-dimentional image information 2a imaged thereon into an electrical signal by electronically scanning the image 2a. The two-dimentional image sensor 8' comprises a plurality of arrays of optical imaging elements of charge transfer device type. Therefore, the optical imaging elements on each array are divided into two groups as described in connection with the first and second embodiments so that each group can be driven in the same manner as in the first or second embodiment. Thus, similar effects to the first and second embodiments may be obtained with such a two-dimensional image sensor 8'.

Although it has been described that the optical imaging elements or photodiodes in the form of an array are divided into two groups so that odd and even signal charges are respectively derived independent of the other, a single optical imaging element array may be divided into more than two groups with more than two shift registers employed. Namely, signal charges in respective groups may be derived one after another. Namely, when high resolving power is not required because of sufficient thickness or width of optical information, the number of groups may be increased to more than two. Such increase in the number of groups results in increase in speed in reading operation because more than two read data can be obtained within the aforementioned time period $T_1$. When electrically dividing the optical imaging elements of a single array into more than two groups, it is preferable that optical imaging elements of each group are equidistantly arranged.

The above-described embodiments are just examples of the present invention, and therefore, it will be apparent for those skilled in the art that many modifications and variations may be made without departing from the spirit of the present invention.

What is claimed is:

1. An optical reading apparatus for converting optically readable information into an electrical signal, comprising:
a charge transfer device image sensor for converting optical information into an electrical signal, said image sensor having a plurality of optical imaging elements arranged in an array, said optical imaging elements being electrically divided into two or more groups so that signal charges from one group can be derived simultaneously, said image sensor having an output circuit responsive to a plurality of electrical signals each produced by each of said two or more groups so that said plurality of electrical signals are combined as a single output signal;
means for driving said image sensor so that said image sensor performs electronic scanning by deriving signal charges from said optical imaging elements, said means producing at least two clocks which are shifted by an amount of time from each other, said at least two clocks being fed to said image sensor in such a manner that at least two groups of said optical imaging elements are driven alternately; and
means responsive to said output signal from said image sensor for processing the same to produce an electrical signal indicative of the read information.

2. An optical reading apparatus as claimed in claim 1, wherein said optical imaging elements are divided into two groups so that one group includes optical imaging elements of odd number and the other includes optical imaging elements of even number, wherein odd and even numbers indicate the position of each optical imaging element viewed from one end of the array.

3. An optical reading apparatus as claimed in claim 1, wherein said image sensor comprises a charge-coupled device.

4. An optical reading apparatus as claimed in claim 1, wherein said two clocks are first and second sequences of pulses, the pulses of the second sequence being delayed from the pulses of the first sequence by an amount sufficient to cause the signal charges, derived in response to a pulse of said first sequence, to be read out from said image sensor within a time period between said pulse of said first sequence and a subsequently coming pulse of said second sequence.

5. An optical reading apparatus as claimed in claim 4, wherein the pulses of the second sequence are delayed from the pulses of the first sequence by 180 degrees wherein the pulses of the first sequence have a period of 360 degrees.

6. An optical reading apparatus for converting optically readable information into an electrical signal, comprising:
a charge transfer device image sensor for converting optical information into an electrical signal, said image sensor having a plurality of optical imaging elements arranged in an array, said optical imaging elements being electrically divided into two or more groups so that signal charges from one group can be derived simultaneously, said image sensor having an output circuit responsive to a plurality of electrical signals each produced by each of said two or more groups so that said plurality of electrical signals are combined as a single output signal;
means for driving said image sensor so that said image sensor performs electronic scanning by deriving signal charges from said optical imaging elements, said means producing at least two clocks which are fed to said image sensor so that at least two groups of said optical imaging elements are driven;
means for controlling the means for driving so that said at least two clocks have one of first and second time relationships therebetween, said at least two clocks being shifted by an amount of time from each other when in the first time relationship, and said at least two clocks being of the same timing when in the second time relationship, said two clocks having the first time relationship therebetween causing said image sensor to derive signal charges of one group after signal charges of another group have been derived, and said two clocks having the second relationship therebetween causing said image sensor to derive signal charges of all groups simultaneously; and
means responsive to said output signal from said image sensor for processing the same to produce an electrical signal indicative of the read information.

7. An optical reading apparatus as claimed in claim 6, wherein said optical imaging elements are divided into two groups so that one group includes optical imaging elements of odd number and the other includes optical imaging elements of even number, wherein odd and even numbers indicate the position of each optical imaging element viewed from one end of the array.

8. An optical reading apparatus as claimed in claim 6, wherein said image sensor comprises a charge-coupled device.

9. An optical reading apparatus as claimed in claim 6, wherein said two clocks are first and second sequences of pulses, when in the first time relationship, the pulses of the second sequence being delayed from the pulses of the first sequence by an amount sufficient to cause the signal charges, derived in response to a pulse of said first sequence, to be read out from said image sensor within a time period between said pulse of said first sequence and a subsequently coming pulse of said second sequence.

10. An optical reading apparatus as claimed in claim 9, wherein when in the first time relationship, the pulses of the second sequence are delayed from the pulses of the first sequence by 180 degrees wherein the pulses of the first sequence have a period of 360 degrees.

11. A method of optically reading optically readable information by means of a charge transfer device image sensor for converting optical information into an electrical signal, said image sensor having a plurality of optical imaging elements arranged in an array, said optical imaging elements being electrically divided into two or more groups so that signal charges from one group can be derived simultaneously, said image sensor having an output circuit responsive to a plurality of electrical signals each produced by each of said two or more groups so that said plurality of electrical signals are combined as a single output signal, said method comprising the steps of:

causing the optical imaging elements to deliver output signals therefrom so that one group of said optical imaging elements deliver signal charges after another group has delivered signal charges;

deriving the signal charges of one group one after another so as to process corresponding electrical signals to detect optical information; and repeating the above steps with respect to each group of said optical imaging elements.

12. A method as claimed in claim 11, wherein the number of said groups is two so that signal charges of odd number and signal charges of even number are respectively derived at differnt timings, wherein odd and even numbers indicate the position of each optical imaging element viewed from one end of the array.

13. A method as claimed in claim 11, wherein the step of causing comprises a step of applying to said image sensor first and second sequences of pulses, the pulses of the second sequence being delayed from the pulses of the first sequence by an amount sufficient to cause the signal charges, derived in response to a pulse of said first sequence, to be read out from said image sensor within a time period between said pulse of said first sequence and a subsequently coming pulse of said second sequence.

* * * * *